US012783055B1

(12) United States Patent
Sanghvi et al.

(10) Patent No.: US 12,783,055 B1
(45) Date of Patent: Nov. 3, 2026

(54) SYSTEM AND METHOD FOR GENERATING HAPTIC FEEDBACK-BASED DEDICATED TEMPORARY MESH NETWORK CONNECTIONS

(71) Applicant: Bank of America Corporation, Charlotte, NC (US)

(72) Inventors: Siten Sanghvi, Westfield, NJ (US); Naga Vamsi Krishna Akkapeddi, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 19/263,259

(22) Filed: Jul. 8, 2025

(51) Int. Cl.
*G06F 3/01* (2006.01)
*G06F 3/16* (2006.01)
*G06F 21/56* (2013.01)

(52) U.S. Cl.
CPC ................ *G06F 3/016* (2013.01); *G06F 3/16* (2013.01); *G06F 21/56* (2013.01)

(58) Field of Classification Search
None
See application file for complete search history.

(56) References Cited

U.S. PATENT DOCUMENTS 8,539,582 B1 * 9/2013 Aziz ..................... H04L 63/145 713/150
9,159,064 B1 10/2015 Inotay et al.
9,189,722 B2 11/2015 Inotay et al.
9,477,317 B1 10/2016 Clements
9,576,285 B2 2/2017 Zhou
9,646,300 B1 5/2017 Zhou et al.
9,672,688 B2 6/2017 Lyons
9,704,151 B2 7/2017 Zhou et al.
9,754,443 B2 9/2017 Hedrick et al.
9,821,221 B2 11/2017 Patton et al.
9,953,308 B2 4/2018 Xing
10,095,833 B2 10/2018 Balram et al.
10,402,551 B2 9/2019 Lynch
10,459,518 B2 10/2019 Lutnick et al.
10,554,656 B2 2/2020 Chang et al.
10,649,579 B1 5/2020 Smith
10,693,996 B2 6/2020 Gao et al.
11,810,131 B2 11/2023 Rodkey
12,223,480 B1 2/2025 Walker et al.
2012/0158541 A1 * 6/2012 Ganti ................ G06Q 30/0185 705/26.35
2016/0110695 A1 4/2016 Zhou et al.
2017/0140366 A1 5/2017 Xing (Continued)

*Primary Examiner* — Christopher R Lamb

(57) ABSTRACT

A system for generating haptic feedback-based dedicated temporary mesh network connections includes a memory operably coupled with a processor. The processor is configured to receive an interaction request from a first source device to initiate an interaction with a first terminal device. The processor is configured to identify, based on a search, that a first haptic input signal pattern is associated with a first type of interaction. The processor is configured to initiate the temporary mesh network connection between the first source device and the first terminal device. The processor is configured to output the first audio signal at the first source device and output the second audio signal at the first terminal device in response to determining that the operation was successfully completed.

20 Claims, 4 Drawing Sheets

(56) References Cited

U.S. PATENT DOCUMENTS

| | | | | |
|---|---|---|---|---|
| 2017/0243195 | A1 | 8/2017 | Xing | |
| 2018/0048610 | A1 | 2/2018 | Malahy | |
| 2019/0394224 | A1 | 12/2019 | Hamdi | |
| 2020/0274919 | A1* | 8/2020 | Shah | G06F 9/452 |
| 2020/0342499 | A1 | 10/2020 | Tunnell et al. | |
| 2021/0196423 | A1 | 7/2021 | Shelton, IV et al. | |
| 2021/0224791 | A1* | 7/2021 | Gower | G06Q 20/352 |
| 2021/0334779 | A1* | 10/2021 | Goodwin, III | G06Q 20/3274 |
| 2022/0172294 | A1 | 6/2022 | Irwin et al. | |
| 2023/0325807 | A1* | 10/2023 | Suzuki | G01S 13/765 |
| 2024/0320722 | A1 | 9/2024 | Smith et al. | |

* cited by examiner

SYSTEM AND METHOD FOR GENERATING HAPTIC FEEDBACK-BASED DEDICATED TEMPORARY MESH NETWORK CONNECTIONS

TECHNICAL FIELD

The present disclosure relates generally to network communications and, more specifically, to a system and method for generating haptic feedback-based dedicated temporary mesh network connections.

BACKGROUND

In a network environment, source devices (e.g., a smartwatch) are used to communicate data with terminal devices (e.g., Internet of Things (IoT) devices). These network environments allow wireless interaction between the source and terminal devices. Wireless interactions between these devices are vulnerable to malicious activities (e.g., eavesdropping attacks) by bad actors. Some of the technical challenges that occur when data is exchanged as part of the wireless interaction are controlling eavesdropping or unauthorized access to the data. These malicious activities may compromise network security as well as the data security of sensitive user data as part of the wireless interaction. Existing systems are unable to provide secure communication between source devices and terminal devices. Existing systems rely on system failure reports to detect these attacks.

SUMMARY

The disclosed system, described in the present disclosure, is particularly integrated into a practical application for generating haptic feedback-based dedicated temporary mesh network connections. The disclosed system addresses technical problems rooted in wireless communications and achieves technical improvements to the network, the source and terminal devices used in wireless communications, and the underlying computer systems that facilitate wireless communications between the source and terminal devices. The system and method implemented by the system, as disclosed in the present disclosure, provide technical solutions to the technical problems discussed above by generating haptic feedback-based dedicated temporary mesh network connections between source devices (e.g., a mobile phone or a smartwatch) and terminal devices (e.g., an automated teller machine (ATM), vending machines, parking meters, or any other IoT device).

Conventional technologies are not configured to provide secure network communications between source devices and terminal devices. One of the technical challenges that occurs is to provide a secure and efficient solution for controlling eavesdropping or unauthorized access to data that may compromise network security and the data security of sensitive user data. In conventional approaches, for a wireless (e.g., Bluetooth®) interaction performed between a source device and a terminal device, the most common malicious activity is an eavesdropping attack. In an eavesdropping attack, interactions between the source devices and the terminal devices are intercepted. This attack typically occurs because a terminal device is compromised and/or a source device is compromised by malware attacks, causing the data exchanged as part of the interaction also to be compromised. Specifically, a request is generated in response to a wireless interaction between a source device and a terminal device, and bad actors intercept these requests to gain access to sensitive user data (e.g., payment account information, payment card number, etc.) and network security data (e.g., network server IP address or MAC address, etc.) that is part of the wireless interaction. Bad actors gaining access to sensitive user data and network security data may result in data exfiltration by transmitting confidential data to unauthorized devices. In some cases, the stolen data may be used to perform other unauthorized data interactions within the computing infrastructure and to gain access to computing systems (e.g., server devices) and cause system damage (e.g., data theft, compromised computing performance, device failure, etc.) to those other computing systems in communication with the server device. To remedy such harmful actions (i.e., system damage and data exfiltration), the affected computing systems must be taken offline until the root problem is identified, thus making them inaccessible until the problem is identified and remedied. When a computing system is taken offline, it may further cause the computing systems to shut down or go offline and thus be unavailable to provide services. This results in, for example, under-utilization of the affected computing systems, resulting in reduced performance of the network. In a situation where multiple computing systems may go offline, it may result in the disruption of network operations across the network. In some cases, the disruption of network operations across a network is often associated with unnecessary data redundancy and thus reduces the overall network performance. Further, multiple computing systems go out of service, resulting in increased downtime that further generates inaccurate network resource usage patterns, which results in inaccurate network resource allocation.

Conventional techniques suffer from several drawbacks in providing secure communication between source devices and terminal devices. Conventional technologies are unable to provide secure, encrypted communications between source devices and terminal devices. Since conventional techniques do not provide end-to-end encryption, they are not able to control access to data and, hence, are not able to evade attacks. Conventional technologies rely on failure reports to detect attacks after the attack. By the time these failure reports are received, the attack has done its intended damage. Embodiments of the present disclosure provide several practical applications and technical advantages that provide solutions to the problems discussed above in relation to conventional computing systems and networks.

Thus, unlike conventional systems that are not configured to provide secure network communications between the source device and the terminal device. The disclosed system generates haptic feedback-based dedicated temporary mesh network connections between the source devices and the terminal devices. This temporary mesh network connection may utilize a transport layer security protocol (e.g., TLS 1.3) that provides end-to-end encryption for all the data exchanged between the source device and the terminal device. Thus, providing an end-to-end encrypted communication based on encrypted tokens (e.g., first source token and first terminal token). Additionally, the disclosed system, in response to receiving a connection initiation request (from a source device) to establish a connection with the terminal device, determines whether a device identifier associated with a source device is included within a plurality of malicious device identifiers. Upon determining that the device identifier associated with the source device is included within the plurality of malicious device identifiers, the disclosed system quarantines the connection initiation request in a quarantine memory sector (which is an isolated portion of the memory at a server device). As part of quarantining the connection initiation request, the connection initiation request is transferred from the source device into the quarantine memory sector within the server device. Thus, the connection initiation request is moved away from the source device to the quarantine memory sector within the server device. Once the connection initiation request is transferred into the quarantine memory sector, the disclosed system deletes a software code in the connection initiation request that at least partially matches one of the known malicious software codes to generate a sanitized version of the connection initiation request. By generating the sanitized version of the connection initiation request, the disclosed system proactively mitigates a threat associated with the connection initiation request. The sanitized version of the connection initiation request, without the malicious software code, is then transmitted to the terminal device to initiate the temporary mesh network connection between the source device and the terminal device to perform the interaction based on the sanitized version of the connection initiation request.

Thus, unlike conventional systems that are unable to provide secure communication between source devices and terminal devices, the disclosed system and method proactively mitigate threats associated with the connection initiation request and provide end-to-end secure communication between source devices and terminal devices (as explained above). Further, when bad actors gain access to sensitive user data and network security data, it may cause damage to other computing systems in communication with the server device. By providing encrypted and dedicated temporary mesh network connections and by mitigating threats (by quarantining) associated with the connection initiation request, bad actors are restricted from gaining access to sensitive user data and network security data, thus minimizing fraudulent activities during wireless interaction. As a result of restricting bad actors, the system stops system damage from occurring by evading unauthorized access to the server device. Further, by evading unauthorized access on the server device, the system mitigates the above-described harmful actions that may otherwise occur to the other computing systems in communication with the server device, thus saving downtime associated with affected computing systems and additionally saving resources that would otherwise be necessary to remediate affected computing systems, which in turn provides uninterrupted operations of the network.

Avoiding the breakdown of operations evades any disruption of network operations, thereby reducing or preventing system damage from occurring. The system thus mitigates the above-described harmful actions that may otherwise occur to the other organizational resources in communication with the source device, thus saving downtime associated with affected devices and additionally saving resources that would otherwise be necessary to remediate affected devices, which in turn provides uninterrupted operations of the organizational network. This leads to improved operational efficiency of computing systems because the computing systems are not required to be taken offline for remediation. Other examples of harmful actions that the disclosed system is able to evade before an attack may include service disruption of the computing systems, data espionage, and identity theft.

Other technical benefits include minimizing system downtime and enabling faster and more effective remediation of network errors. These benefits lead to additional technical benefits such as enhanced network resilience, increased operational continuity, and faster recovery times. Proactively mitigating threats associated with the connection initiation request leads to minimizing system downtime and strengthens the overall stability of the system, reducing the likelihood of unexpected outages. Effective monitoring and rapid response mechanisms allow for quicker restoration of system functionality in case of failures, minimizing the impact of any downtime that does occur. Reduced downtime also helps prevent data loss by ensuring consistent system operation and reducing the risk of corruption during unexpected outages. Monitoring system performance during uptime enables identification of bottlenecks and potential issues, allowing for proactive optimization and improved overall system efficiency. With a robust system that minimizes downtime, entities can more easily scale operations and adapt to changing demands without significant disruptions.

In some embodiments, a system for generating haptic feedback-based dedicated temporary mesh network connections includes a memory operably coupled with a processor. The memory is configured to store a haptic input database and a plurality of malicious device identifiers. The haptic input database comprises a plurality of haptic input signal patterns. Each of the plurality of haptic input signal patterns is associated with a corresponding type of interaction and each of the malicious device identifiers is associated with a corresponding source device that has been previously identified as performing malicious activities. The processor is configured to receive an interaction request from a first source device to initiate an interaction with a first terminal device. The interaction request comprises a first haptic input signal pattern generated by a sensor on the first source device in response to receiving an input at the first source device. The processor is configured to electronically search the haptic input database based on the first haptic input signal pattern. The processor is configured to identify, based on the search, that the first haptic input signal pattern is associated with a first type of interaction. The first type of interaction is associated with a first audio signal that is outputted by the first source device upon completion of the first type of interaction. The processor is configured to identify a list of terminal devices that are within a first threshold distance to the first source device. The list of terminal devices comprises the first terminal device. The processor is configured to receive a selection of the first terminal device from the list of terminal devices in response to identifying the list of terminal devices. The processor is configured to cause the first source device to transmit a connection initiation request to the first terminal device in response to receiving the selection of the first terminal device. The connection initiation request is to initiate a temporary mesh network connection between the first source device and the first terminal device to perform the first type of interaction. The connection initiation request comprises a source token associated with the first source device and the source token comprises a device identifier associated with the first source device and a terminal output configuration. The terminal output configuration comprises an indication of a second audio signal to be outputted by the first terminal device upon completion of the first type of interaction. The processor is configured to determine whether the device identifier is included within the plurality of malicious device identifiers stored in the memory. The processor is configured to initiate the temporary mesh network connection between the first source device and the first terminal device to perform the first type of interaction in response to determining that the device identifier is not included within the plurality of malicious device identifiers. The processor is configured to monitor the first type of interaction being performed using the temporary mesh network connection between the first source device and the first terminal device. The first type of interaction comprises performing an operation with the first terminal device. The processor is configured to determine whether the operation was successfully completed in response to monitoring the first type of interaction. The processor is configured to output the first audio signal at the first source device and output the second audio signal at the first terminal device in response to determining that the operation was successfully completed. The first audio signal and the second audio signal are different from each other.

Some embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of embodiments of the disclosure and the potential advantages thereof, reference is now made to the following written description taken in conjunction with the accompanying drawings, in which.

DETAILED DESCRIPTION OF THE DRAWINGS

As described above, conventional technologies fail to provide secure network communications between source devices and terminal devices. Embodiments of the present disclosure and its advantages may be understood by referring to FIGS. 1-3B. FIGS. 1-3B are used to describe systems and methods for generating haptic feedback-based dedicated temporary mesh network connections, according to some embodiments.

System Overview

Figure 1:
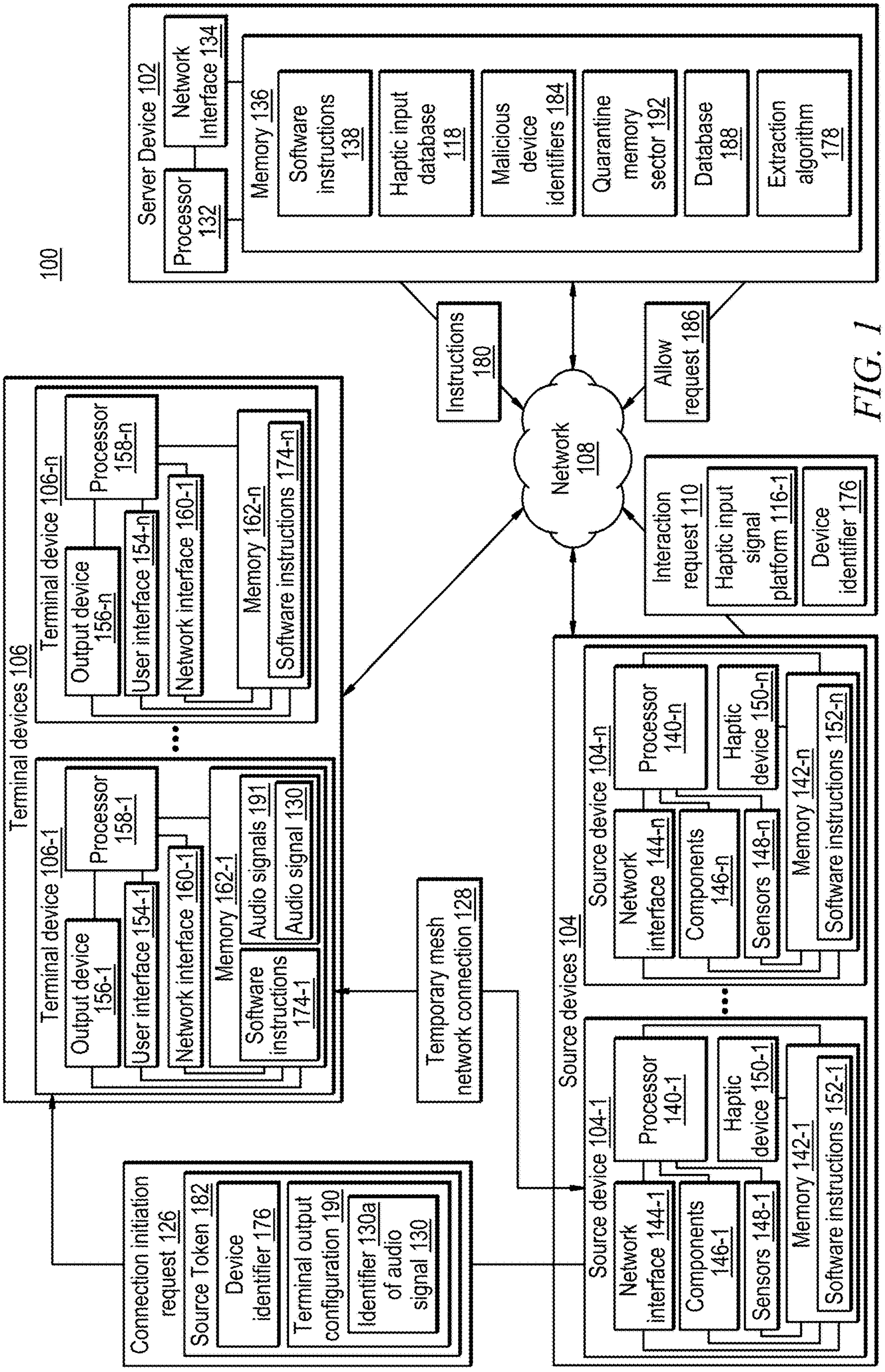
FIG. 1 is a schematic diagram of a system, in accordance with an embodiment of the present disclosure.

FIG. 1 is a schematic diagram of a system 100, in accordance with certain aspects of the present disclosure. As shown, system 100 includes a server device 102, source devices 104-1 to 104-*n*, terminal devices 106-1 to 106-*n*, operably connected to one another and communicating via a network 108. Network 108 enables communication among the components of the system 100. In other embodiments, system 100 may include other elements instead of, or in addition to, those listed above. The source devices 104-1 to 104-*n* are collectively also referred to as the source devices 104. The terminal devices 106-1 to 106-*n* are collectively also referred to as the terminal devices 106.

Figure 2:
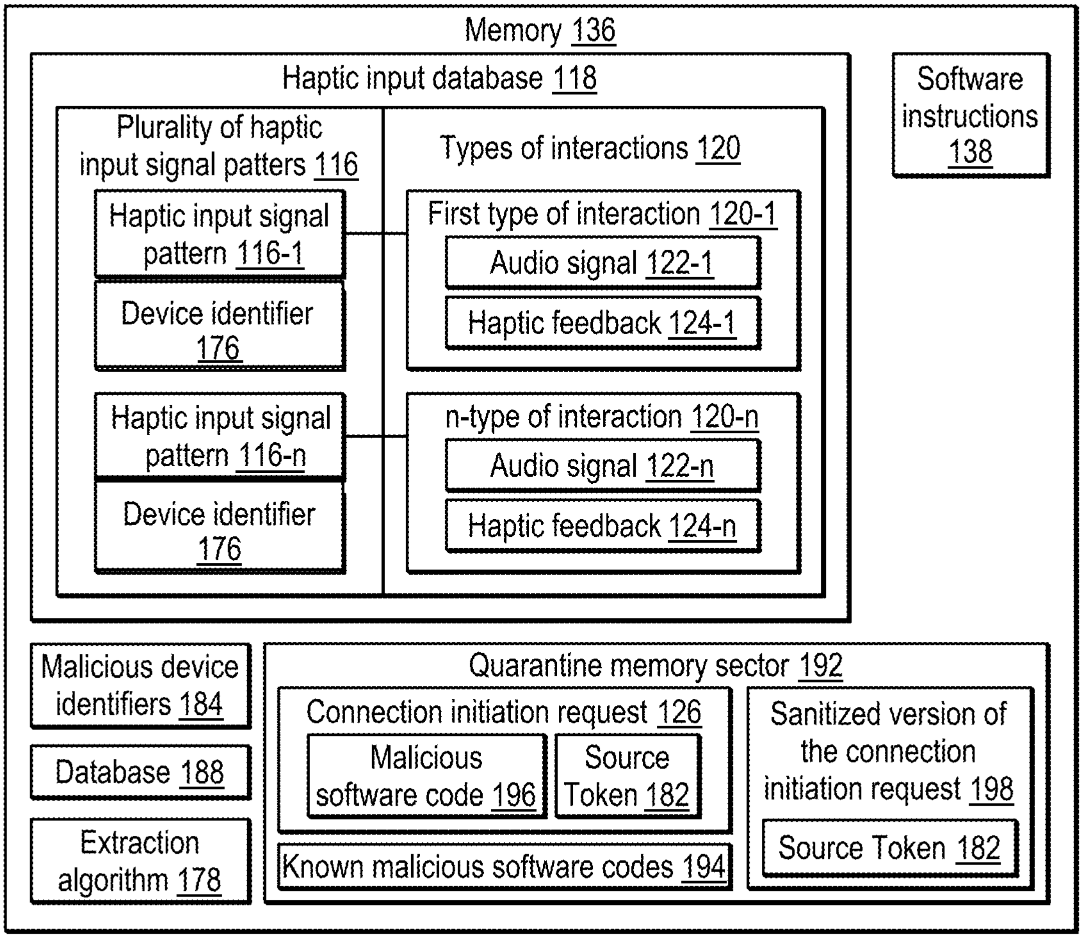
FIG. 2 is a schematic diagram of the memory of the system of FIG. 1, in accordance with an embodiment of the present disclosure.

In general, the working of system 100 is explained with reference to FIGS. 1-2. Specifically, the working of system 100 initiates at one of the source devices 104 (e.g., source device 104-1). The source device 104-1 generates an interaction request 110 and transmits it to the server device 102. The interaction request 110 may be generated at the source device 104-1 in response to receiving an input 112 from a user 114 associated with the source device 104-1. In an example, the source device 104-1 is a smartwatch or a mobile phone, and the terminal device 106-1 is an ATM. When the user 114 associated with the source device 104-1 intends to interact with one of the terminal devices 106 (e.g., terminal device 106-1), the user 114 may provide an input 112, for example, the input 112 may include a double tap gesture performed on a touch screen of the source device 104-1 by the user 114. The source device 104-1 is configured to generate a haptic input signal pattern 116-1 (i.e., digital signal) associated with the input 112 (i.e., double tap gesture). Further, the source device 104-1 is configured to generate an interaction request 110 in response to receiving the input 112 from the user 114. Source device 104-1 transmits the interaction request 110 to the server device 102. The interaction request 110 includes the haptic input signal pattern 116-1. The server device 102, upon receiving the interaction request 110, extracts the haptic input signal pattern 116-1 and accesses a haptic input database 118 to determine a first type of interaction 120-1 corresponding to the haptic input signal pattern 116-1. The first type of interaction 120-1, is to perform an operation to check account information at one of the terminal devices 106 (e.g., terminal device 106-1). The first type of interaction 120-1, also identifies an audio signal 122-1 and a haptic feedback 124-1 to be output at the source device 104-1 upon completion of the first type of interaction 120-1. The server device 102 transmits a connection initiation request 126 to the terminal device 106-1.

The connection initiation request 126 is to initiate a temporary mesh network connection 128 that is dedicated between the source device 104-1 and the terminal device 106-1 to perform the first type of interaction 120-1. The connection initiation request 126 includes an indication of an audio signal 130 to be output by the terminal device 106-1 upon completion of the first type of interaction 120-1. Further, server device 102 is configured to determine whether an operation associated with the first type of interaction 120-1 was successfully completed. Upon determining that the operation associated with the first type of interaction 120-1 was successfully completed, the server device 102 outputs the audio signal 122-1 and the haptic feedback 124-1 at the source device 104-1 and outputs the audio signal 130 at the terminal device 106-1.

SYSTEM COMPONENTS

Server Device

The server device 102 includes a processor 132 and a network interface 134 in signal communication with a memory 136. Memory 136 stores software instructions 138 that, when executed by processor 132, cause processor 132 to perform one or more operations of the server device 102 described herein.

Processor

Processor 132 includes one or more processors. Processor 132 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors are configured to execute instructions (e.g., software instructions 138) to perform the operations of the server device 102 described herein. The processor 132 is configured to operate as described in FIGS. 1-3B. For example, processor 132 may be configured to perform one or more operations of method 300 as described in FIGS. 3A-3B.

Network Interface

The network interface 134 may include an NFC interface, a Bluetooth® interface, a Zigbee® interface, a Z-wave® interface, a radio-frequency identification (RFID®) interface, a WIFI® interface, a local area network (LAN) interface, a wide area network (WAN) interface, a metropolitan area network (MAN) interface, a personal area network (PAN) interface, a wireless PAN (WPAN) interface, a modem, a switch, and/or a router. Network interface 134 is configured to enable wired and/or wireless communications. The network interface 134 may be configured to communicate data between the server device 102 and other devices, systems, or domains. The processor 132 may be configured to send and receive data using the network interface 134 and/or the network 108. The network interface 134 may be configured to use any suitable type of communication protocol.

Memory

The memory 136 may be volatile or non-volatile and may comprise read-only memory (ROM), random-access memory (RAM), ternary content-addressable memory (TCAM), dynamic random-access memory (DRAM), and static random-access memory (SRAM). The memory 136 may include one or more of a local database, a cloud database, a network-attached storage (NAS), etc. The memory 136 comprises one or more disks, tape drives, or solid-state drives and may be used as an over-flow data storage device to store programs when such programs are selected for execution and to store instructions and data that are read during program execution. Memory 136 may store any of the information described in FIGS. 1-3B, along with any other data, instructions, logic, rules, or code operable to implement the function(s) described herein when executed by processor 132. For example, memory 136 may store a haptic input database 118, software instructions 138, an extraction algorithm 178, malicious device identifiers 184, a database 188, a quarantine memory sector 192, and/or any other data or instructions. The software instructions 138 may include any suitable set of instructions, logic, rules, or code operable to execute the processor 132 and perform the functions described herein, such as some or all of those described in FIGS. 1-3B.

Source Devices

System 100 includes source devices 104-1 to 104-*n*, these are collectively referred to as source device 104. The source devices 104-1 to 104-*n* may generally be any device configured to process data. Source devices 104-1 to 104-*n* may also include, but are not limited to, a smartwatch, a personal computer, a desktop computer, a workstation, a server, a laptop, a tablet computer, a mobile phone (such as a smartphone), an Internet-of-Things (IoT) device, a wearable computing device, smart glasses or bracelets, phablets, other smart devices, devices configured for wired or wireless RF (Radio Frequency) communication, or any other suitable type of device. Source devices 104-1 to 104-*n* are utilized to perform wireless interactions with terminal devices 106-1 to 106-*n* and server device 102.

Each of the source devices 104 is generally any device that is configured to process data and communicate with other components of the system 100 via the network 108. Each of the source devices 104-1 to 104-*n* includes a respective one of processors 140-1 to 140-*n* (collectively referred to as processors 140) in signal communication with a respective one of memories 142-1 to 142-*n* (collectively referred to as memories 142) and a respective one of network interfaces 144-1 to 144-*n* (collectively referred to as network interfaces 144) and a respective one or more of components 146-1 to 146-*n* (collectively referred to as components 146), a respective one of sensors 148-1 to 148-*n* (collectively referred to as sensors 148) and a respective one of haptic devices 150-1 to 150-*n* (collectively referred to as haptic devices 150). In an embodiment, each of the source devices 104 may include a plurality of components 146 and a plurality of sensors 148-1.

Although FIG. 1 shows a user 114 interacting with the source device 104-1, each of the source devices 104 may also be associated with a corresponding user 114.

Processor

Each of the processors 140 includes one or more processors operably coupled to a respective one of the memories 142. Each of the processors 140 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). Each of the processors 140 may be a programmable logic device, a microcontroller, a microprocessor, or any suitable combination of the preceding. One or more processors are configured to process data and may be implemented in hardware or software. For example, each of the processors 140 may be 8-bit, 16-bit, 32-bit, 64-bit, or of any other suitable architecture. Each of the processors 140 is configured to implement various software instructions. For example, each of the processors 140 is configured to execute respective ones of software instructions 152 (e.g., software instructions 152-1 through 152-*n*) that are stored in a respective one of the memories 142 in order to perform the operations described herein. Each of the processors 140 is configured to operate as described in FIGS. 1-3B. For example, each of the processors 140 may be configured to perform one or more operations of method 300 as described in FIGS. 3A-3B.

Network Interface

Each of the network interfaces 144 may include an NFC interface, a Bluetooth® interface, a Zigbee® interface, a Z-wave® interface, a radio-frequency identification (RFID®) interface, a WIFI® interface, a local area network (LAN) interface, a wide area network (WAN) interface, a metropolitan area network (MAN) interface, a personal area network (PAN) interface, a wireless PAN (WPAN) interface, a modem, a switch, and/or a router. Each of the network interfaces 144 is configured to enable wired and/or wireless communications. Each of the network interfaces 144 may be configured to communicate data between each of the terminal devices 106 and the server device 102 and other components of the system 100. Each of the respective processors 140 may be configured to send and receive data using the respective one of the network interfaces 144. Each of the network interfaces 144 may be configured to use any suitable type of communication protocol as would be appreciated by one of ordinary skill in the art. The suitable communication protocols may comprise HTTPs, JMS, SOAP, JSON, JDBC, File, or the like. The suitable transport layers may comprise TLS, SSL, (OAUTH, Certs), or the like. Data security may be achieved using suitable digital signatures, digital certificates, and encryption. The source devices 104 are configured to communicate with other devices and components of the system 100 via the network 108.

Memory

Each of the memories 142 may be volatile or non-volatile and may comprise read-only memory (ROM), random-access memory (RAM), ternary content-addressable memory (TCAM), dynamic random-access memory (DRAM), and static random-access memory (SRAM). Each of the memories 142 may include one or more of a local database, a cloud database, a network-attached storage (NAS), etc. Each of the memories 142 comprises one or more disks, tape drives, or solid-state drives and may be used as an overflow data storage device to store programs when such programs are selected for execution and to store instructions and data that are read during program execution. Each of the memories 142 may store any of the information described in FIGS. 1-3B along with any other data, instructions, logic, rules, or code operable to implement the function(s) described herein when executed by the respective one of the processors 140. For example, memory 142-1 associated with source device 104-1 may store software instructions 152-1 and/or any other data or instructions. The software instructions 152-1 may include any suitable set of instructions, logic, rules, or code operable to execute the processor 140-1 and perform the functions described herein, such as some or all of those described in FIGS. 1-3B.

Components

Each of the source devices 104 includes one or more of the components 146.

The components 146 may include a user interface, such as a display screen, a touch screen, a microphone, a camera, a keypad, a speaker, an audio port, or other appropriate equipment usable by user 114. Each of the processors 140 and memories 142 of the corresponding source devices 104 is operably coupled with the corresponding components 146. Further, the source devices 104 may utilize the components 146 to perform one or more operations associated with the source devices 104, the terminal devices 106, and the server device 102. For example, server device 102 is configured to determine whether an operation associated with the first type of interaction 120-1 was successfully completed, in response to initiating a temporary mesh network connection 128 between the source device 104-1 and the terminal device 106-1 to perform the first type of interaction 120-1. Upon determining that the operation associated with the first type of interaction 120-1 was successfully completed, the server device 102 outputs the audio signal 122-1 at the source device 104-1 via one of the components 146-1, for example, a speaker. Thus, in this example, one of the components 146-1 is a speaker that outputs the audio signal 122-1.

Sensors

Each of the source devices 104 includes sensors 148. The sensors 148 may be any sensor that receives input 112 from user 114 and converts the input 112 (i.e., analog signals) into one of a haptic input signal patterns 116-1 to **116-*n* (i.e., digital signals). The haptic input signal patterns 116-1 to 116-*n* are a digital representation of the input 112 received from the user 114 on the source devices 104. Each of the processors 140 and memories 142 of the corresponding source devices 104 is operably coupled with the corresponding sensors 148. Further, the source devices 104 may utilize the sensors 148 to perform one or more operations associated with the source devices 104, the terminal devices 106, and the server device 102. The sensors 148 are configured to sense an input 112 from the user 114. The input 112 may include any form of a gesture performed on the source devices 104. For example, the gestures may include a swipe gesture, a tap gesture, and a scroll gesture performed on the source device 104. In an embodiment, the component 146-1 may be a touchscreen that is coupled to sensor 148-1 that performs a touch sensing mechanism and is configured to sense an input 112 from the user 114. The input 112 may be a swiping gesture, a tapping gesture, or a scrolling gesture performed on the component 146-1 (e.g., a touchscreen). The sensors 148 may include hardware sensor circuitry, sensing elements, electronic circuit boards that include capacitors, transistors, resistors, microprocessors, and other components arranged to detect input 112. The sensors 148 may include, but are not limited to, capacitive sensors, resistive sensors, optical sensors, and other such touch sensing mechanisms. The sensors 148 are configured to sense a touch input from an appendage of a user 114, such as a digit or fingers of the user 114, an interactive instrument, such as a stylus, or other suitable apparatus capable of interacting with the touch sensing mechanism. In an example, the input 112 is a double-tap gesture on the component 146-1 (e.g., a touchscreen). The sensor 148-1 is configured to receive the input 112 (e.g., touch) and convert the input 112 (i.e., the touch which is received as analog signals) into a haptic input signal pattern 116-1 (i.e., a digital signal) by utilizing an analog to digital converter (ADC). The haptic input signal pattern 116-1 is a digital representation of the input 112**.

Haptic Devices

Each of the source devices 104 includes haptic devices 150. The haptic devices 150 may be any device that generates one of the haptic feedbacks 124-1 to **124-*n*. Haptic device 150 may include an electromechanical device that can generate haptic feedback on the source devices 104 by applying forces, vibrations, or motions that are detectable by the user 114. Each of the processors 140 and memories 142 of the corresponding source devices 104 is operably coupled with the corresponding haptic device 150. Further, the source devices 104 may utilize the haptic device 150 to perform one or more operations associated with the terminal devices 106 and the server device 102. For example, server device 102 is configured to determine whether an operation associated with the first type of interaction 120-1 was successfully completed, in response to initiating a temporary mesh network connection 128 between the source device 104-1 and the terminal device 106-1 to perform the first type of interaction 120-1. Upon determining that the operation associated with the first type of interaction 120-1 was successfully completed, the server device 102 is configured to cause the haptic device 150-1 to generate or output the haptic feedback 124-1 at the source device 104-1. Thus, in this example, the haptic device 150-1 outputs the haptic feedback 124-1 at the source device 104-1**.

Terminal Devices

System 100 includes terminal devices 106-1 to **106-*n*, these are collectively referred to as terminal devices 106. The terminal devices 106-1 to 106-*n* may generally be any device configured to process data. Terminal devices 106-1 to 106-*n* may also include, but are not limited to, any wired and/or wireless device configured to transmit/receive radio signals using NFC®, Bluetooth®, dedicated short-range communications (DSRC®), RFID®, universal serial bus (USB®), Wi-Fi®, etc. terminal devices 106-1 to 106-*n* may also include but are not limited to, a card reader device, an automated teller machine (ATM), a parking meter, a vending machine, a thermostat, washing machine, a point of sale (POS) device, a personal computer, a desktop computer, a workstation, a laptop, a tablet computer, a mobile phone (such as a smartphone), an Internet-of-Things (IoT) device, or any other suitable type of device. Each of the terminal devices 106 includes a user interface (e.g., 154-1 to 154-*n*), for example, user interface 154-1 is associated with terminal device 106-1, and user interface 154-*n* is associated with terminal device 106-*n*. Further, each of the terminal devices 106 includes output devices 156 (e.g., 156-1 to 156-*n*), for example, output device 156-1 is associated with terminal device 106-1, and output device 156-*n* is associated with terminal device 106-*n*. Terminal devices 106-1 to 106-*n* may include a display, a microphone, a camera, a keypad, or other appropriate terminal equipment usable by the user 114. Terminal devices 106-1 to 106-*n* are utilized to perform wireless interactions with source devices 104-1 to 104-*n***.

Each of the terminal devices 106 is generally any device that is configured to process data and communicate with other components of the system 100 via the network 108. Each of the terminal devices 106-1 to **106-*n* includes a respective one of processors 158-1 to 158-*n* (collectively referred to as processors 158) in signal communication with a respective one of memories 162-1 to 162-*n* (collectively referred to as memories 162) and a respective one of network interfaces 160-1 to 160-*n* (collectively referred to as network interfaces 160) and a respective one or more of output devices 156-1 to 156-*n* (collectively referred to as output devices 156), a respective one of user interfaces 154-1 to 154-*n* (collectively referred to as user interfaces 154**).

Processor

Each of the processors 158 includes one or more processors operably coupled to a respective one of the memories 162. Each of the processors 158 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). Each of the processors 158 may be a programmable logic device, a microcontroller, a microprocessor, or any suitable combination of the preceding. One or more processors are configured to process data and may be implemented in hardware or software. For example, each of the processors 158 may be 8-bit, 16-bit, 32-bit, 64-bit, or of any other suitable architecture. Each of the processors 158 is configured to implement various software instructions. For example, each of the processors 158 is configured to execute respective ones of software instructions 174 (e.g., software instructions 174-1 through **174-*n*) that are stored in a respective one of the memories 162 in order to perform the operations described herein. Each of the processors 158 is configured to operate as described in FIGS. 1-3B. For example, each of the processors 158 may be configured to perform one or more operations of method 300 as described in FIGS. 3A-3**B.

Network Interface

Each of the network interfaces 160 may include an NFC interface, a Bluetooth® interface, a Zigbee® interface, a Z-wave® interface, a radio-frequency identification (RFID®) interface, a WIFI® interface, a local area network (LAN) interface, a wide area network (WAN) interface, a metropolitan area network (MAN) interface, a personal area network (PAN) interface, a wireless PAN (WPAN) interface, a modem, a switch, and/or a router. Each of the network interfaces 160 is configured to enable wired and/or wireless communications. Each of the network interfaces 160 may be configured to communicate data between each of the terminal devices 106 and the server device 102 and other components of the system 100. Each of the respective processors 158 may be configured to send and receive data using the respective one of the network interfaces 160. Each of the network interfaces 160 may be configured to use any suitable type of communication protocol as would be appreciated by one of ordinary skill in the art. The suitable communication protocols may comprise HTTPS, JMS, SOAP, JSON, JDBC, File, or the like. The suitable transport layers may comprise TLS, SSL, (OAUTH, Certs), or the like. Data security may be achieved using suitable digital signatures, digital certificates, and encryption. The terminal devices 106 are configured to communicate with other devices and components of the system 100 via the network 108.

Memory

Each of the memories 162 may be volatile or non-volatile and may comprise read-only memory (ROM), random-access memory (RAM), ternary content-addressable memory (TCAM), dynamic random-access memory (DRAM), and static random-access memory (SRAM). Each of the memories 162 may include one or more of a local database, a cloud database, a network-attached storage (NAS), etc. Each of the memories 162 comprises one or more disks, tape drives, or solid-state drives and may be used as an overflow data storage device to store programs when such programs are selected for execution and to store instructions and data that are read during program execution. Each of the memories 162 may store any of the information described in FIGS. 1-3B along with any other data, instructions, logic, rules, or code operable to implement the function(s) described herein when executed by the respective one of the processors 158. For example, memory 162-1 associated with terminal device 106-1 may store software instructions 174-1 and/or any other data or instructions. The software instructions 174-1 may include any suitable set of instructions, logic, rules, or code operable to execute the processor 158-1 and perform the functions described herein, such as some or all of those described in FIGS. 1-3B.

Output Device

Each of the terminal devices 106 includes one or more of the output devices 156. The output devices 156 may include a user interface, such as a display screen, a touch screen, a microphone, a camera, a keypad, a speaker, an audio port, or other appropriate equipment usable by user 114. Each of the processors 158 and memories 162 of the corresponding terminal devices 106 is operably coupled with the corresponding output devices 156. For example, server device 102 is configured to determine whether an operation associated with the first type of interaction 120-1 was successfully completed, in response to initiating a temporary mesh network connection 128 between the source device 104-1 and the terminal device 106-1 to perform the first type of interaction 120-1. Upon determining that the operation associated with the first type of interaction 120-1 was successfully completed, the server device 102 outputs the audio signal 130 at the terminal device 106-1 via the output device 156-1, for example, a speaker. Thus, in this example, the output device 156-1 is a speaker that outputs the audio signal 130.

Network

Network 108 may be any suitable type of wireless and/or wired network. The network 108 may be connected to the Internet or a public network. Network 108 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., Wireless Fidelity (WiFi®), Wireless Gigabit (WiGig®), Worldwide Interoperability for Microwave Access (WiMAX®), etc.), a long-term evolution (LTE) network, a universal mobile telecommunications system (UMTS) network, a peer-to-peer (P2P) network, a Bluetooth® network, a near-field communication (NFC) network, and/or any other suitable network. The network 108 may be configured to support any suitable type of communication protocol, as would be appreciated by one of ordinary skill in the art. The server device 102, source devices 104, and terminal devices 106 communicate with each other using the network 108.

Initiate Generating Haptic Feedback-Based Dedicated Temporary Mesh Network Connections The operations of system 100 are explained with reference to FIGS. 1-3B. The system 100 provides a dedicated temporary mesh network connection 128 between each of the source devices 104 and the terminal devices 106 and generates the haptic feedbacks 124-1 to **124-*n*. Further, the operations start at one of the source devices 104 (e.g., source device 104-1), where a user 114 performs a registration with the server device 102**.

Haptic Input Database

As part of the registration, a user 114 of the source device 104-1 may assign a specific type of gesture to one of the types of interactions 120. The types of interactions 120 may include a first type of interaction 120-1, which is to perform an operation of checking account information via one of the terminal devices 106 (e.g., terminal device 106-1). Further, the user 114 also assigns an audio signal 122-1 and haptic feedback 124-1 that is to be output at the source device 104-1 in response to the operation of checking account information being completed at the terminal device 106-1.

The audio signal 122-1 may include any type of audio sound (i.e., audio file, such as an MP3 file (Moving Picture Experts Group (MPEG)-1 Audio Layer 3), etc.) that can be output from the source devices 104. The haptic feedback 124-1 may be any type of haptic feedback response generated by the haptic devices 150 on the source devices 104. The haptic feedbacks 124 (i.e., 124-1 to **124-*n*) may be any response output by the haptic devices 150, which is an electromechanical device that can generate haptic feedbacks 124 on the source devices 104 by applying forces, vibrations, or motions that are detectable by the user 114 corresponding to the source devices 104. The haptic feedback 124-1 may include vibrating the source device 104-1** for a specific time period. For example, the time period may be one second, two seconds, one minute, or any other time period.

In an embodiment, the haptic feedback 124-1 may include vibrating the source devices 104 in a specific pattern that is user-defined, such that when the haptic feedback 124-1 is output at the source device 104-1, the user 114 understands that the first type of interaction 120-1 is completed. In another example, the haptic feedback 124-1 may also be a double tap haptic feedback response that is output at the source device 104-1.

Similarly, n-type of interaction **120-*n* may include performing an operation of withdrawing a first amount of currency from one of the terminal devices 106 (e.g., terminal device 106-1). For example, the user 114 may assign a three-tap gesture on the source device 104-1 to the n-type of interaction 120-*n*, which is the operation of checking account information via one of the terminal devices 106 (e.g., terminal device 106-1). Further, the user 114 also assigns an audio signal 122-*n* and a haptic feedback 124-*n* that is to be output at the source device 104-1 in response to the operation of withdrawing the first amount of currency from the terminal device 106-1** being completed.

Further, the haptic input signal pattern 116-1 may be generated in response to receiving this input 112 from the user 114. This input 112 (i.e., the double-tap gesture) is performed by the user 114 on the component 146-1 (e.g., a touchscreen), and in response the sensor 148-1 is configured to receive the input 112 (e.g., touch) and convert the input 112 (i.e., the double tap touch which is received as an analog signal) into a haptic input signal pattern 116-1 (i.e., a digital signal) by utilizing an analog to digital converter (ADC). The haptic input signal pattern 116-1 is a digital representation of the input 112. This haptic input signal pattern 116-1, associated with the first type of interaction 120-1, is received by the server device 102 and stored in the haptic input database 118 with the audio signal 122-1 and the haptic feedback 124-1. Similarly, another haptic input signal pattern **116-*n*, associated with the n-type of interaction 120-*n*, is received by the server device 102 and stored in the haptic input database 118 with the audio signal 122-*n* and the haptic feedback 124-*n***.

Further, each of the haptic input signal patterns 116 is transmitted along with a corresponding device identifier 176 associated with the source devices 104. The server device 102 is configured to store each of the haptic input signal patterns 116 with the corresponding device identifier 176 in the haptic input database 118. For example, source device 104-1 has a device identifier 176. Accordingly, when the source device 104-1 transmits the haptic input signal patterns 116-1 to **116-*n* to the server device 102, the source device 104-1 includes its device identifier 176 with the haptic input signal pattern 116-1. As seen in FIG. 2, the haptic input database 118 stores the haptic input signal pattern 116-1 and the haptic input signal pattern 116-*n*, along with the device identifier 176. The device identifier 176 may be any information that identifies the source devices 104. For example, the device identifier 176 may be a MAC (Media Access Control) address or an IP (Internet Protocol) address associated with the source devices 104**.

Once the haptic input signal patterns 116 are stored along with the corresponding type of interactions 129 in the haptic input database 118, the registration of the source device 104-1 associated with the user 114 is completed. The haptic input database 118 stores the haptic input signal patterns 116 as entries along with the corresponding type of interactions 129.

Receive an Interaction Request

Processor 132 of the server device 102 receives an interaction request 110 from a source device 104-1 to initiate an interaction with a terminal device 106-1. The interaction request 110 includes the device identifier 176 and the haptic input signal pattern 116-1 generated by sensor 148-1 on the source device 104-1 in response to receiving the input 112 at the source device 104-1. The interaction request 110 may be generated at the source device 104-1 in response to receiving an input 112 from the user 114 associated with the source device 104-1. In an example, the source device 104-1 is a smartwatch or a mobile phone, and the terminal device 106-1 is an ATM. When the user 114 associated with the source device 104-1 intends to interact with one of the terminal devices 106 (e.g., terminal device 106-1), the user 114 may provide an input 112, for example, the input 112 may include a double tap gesture performed on a touch screen of the source device 104-1 by the user 114. The source device 104-1 is configured to convert the analog signals associated with the input 112 (i.e., double tap gesture) to generate a haptic input signal pattern 116-1 (i.e., digital signal), as explained above. Further, the source device 104-1 is configured to generate an interaction request 110 in response to receiving the input 112 from the user 114. The interaction request includes the haptic input signal pattern 116-1 and the device identifier 176. Source device 104-1 transmits the interaction request 110 to the server device 102.

Electronically Search the Haptic Input Database

Processor 132 of the server device 102 extracts the device identifier 176 and the haptic input signal pattern 116-1 from the interaction request 110. The interaction request 110 may be any digital file. For example, the interaction request 110 may be a JSON (JavaScript Object Notation) file, and the server device 102 applies an extraction algorithm 178 (e.g., a JSON extraction algorithm) to extract the device identifier 176 and the haptic input signal pattern 116-1 from the JSON file. The processor 132 accesses the haptic input database 118 and electronically searches the haptic input database 118 based on the haptic input signal pattern 116-1. Specifically, processor 132 accesses the haptic input database 118 and utilizes the device identifier 176 to perform a lookup operation to search the haptic input database 118 to identify entries that match the device identifier 176. In an embodiment, the processor 132, based on the lookup operation performed on the haptic input database 118, identifies that the entries of the haptic input signal pattern 116-1 and haptic input signal pattern **116-*n* both include the device identifier 176. Next, the processor 132 of the server device 102 compares the haptic input signal pattern 116-1 received from the source device with both of the entries of the haptic input signal pattern 116-1 and the haptic input signal pattern 116-*n* to determine which one of the entries does the interaction request 110 correspond to. Accordingly, based on the comparison, processor 132 determines that the received haptic input signal pattern 116-1 matches the entry associated with the haptic input signal pattern 116-1, and thus determines that the interaction request 110 corresponds to the haptic input signal pattern 116-1. Thus, processor 132 identifies that the haptic input signal pattern 116-1 corresponds with the first type of interaction 120-1. The first type of interaction 120-1 is associated with the audio signal 122-1 that is outputted by the source device 104-1 upon completion of the first type of interaction 120-1**.

Processor 132 of the server device 102 transmits instructions to the processors 140 associated with the source device 104-1 to identify terminal devices 106 that are within a threshold distance D1 to the source device 104-1. In an embodiment, processor 132 of the server device 102 transmits instructions to the processor 140-1 associated with the source device 104-1, and in response to receiving instructions from processor 132, the processor 140-1 associated with the source device 104-1 identifies, for example, a list of terminal devices 106-1 and **106-*n* that are within a threshold distance to the source device 104-1. For example, processor 132 may access the network interface 144-1 of the source device 104-1 to determine a list of terminal devices 106-1 and 106-*n* that are within a threshold distance to the source device 104-1. For example, the network interface 144-1 includes a Bluetooth® interface. For example, when processor 132 utilizes the Bluetooth® interface, then the threshold range of communication associated with the Bluetooth® interface is the threshold distance within which the terminal devices 106-1 and 106-*n* will be identified. In an embodiment, the network interface 144-1 includes an NFC interface. For example, when processor 132 utilizes the NFC interface, then the threshold range of communication associated with the NFC interface is the threshold distance within which the terminal device 106-1** will be identified.

The list of terminal devices 106-1 and **106-*n* is displayed at the source device 104-1. The list of terminal devices 106-1 and 106-*n* may be displayed at a display screen associated with one of the components 146-1 of the source device 104-1. The user 114 may make a selection from the list of terminal devices 106-1 and 106-*n*. For example, the user 114 selects terminal device 106-1 from the list of terminal devices 106-1 and 106-*n* to initiate the first type of interaction 120-1. The selection of the terminal device 106-1 is transmitted by the source device 104-1 to the server device 102**.

Transmit a Connection Initiation Request

Upon receiving the selection of the terminal device 106-1 from the source device 104-1, the server device 102 causes the source device 104-1 to transmit a connection initiation request 126 to the terminal device 106-1. Processor 132 of the server device 102 transmits instructions 180 to the source device 104-1. The instructions 180 may include a software program that directs the processor 140-1 of the source device 104-1 to transmit a connection initiation request 126 to the terminal device 106-1. The connection initiation request 126 initiates a temporary mesh network connection 128 between the source device 104-1 and the terminal device 106-1 to perform the first type of interaction 120-1.

The source device 104-1 transmits the connection initiation request 126 to the terminal device 106-1 by utilizing the network interface 144-1. For example, source device 104-1 utilizes Bluetooth network interface associated with the network interface 144-1 to transmit the connection initiation request 126 to the terminal device 106-1. The connection initiation request 126 includes a source token 182 associated with the source device 104-1. The source token 182 includes a device identifier 176 associated with the source device 104-1. The source token 182 may be any digital file. For example, the source token 182 may be a JSON file. Upon receiving the source token 182, the terminal device 106-1 may extract the device identifier 176 by using the extraction algorithm 178 (e.g., a JSON extraction algorithm) and transmit the device identifier 176 to the server device 102.

Initiate the Temporary Mesh Network Connection

The processor 132 of the server device 102 utilizes the device identifier 176 (e.g., a MAC address) of the source device 104-1 to determine whether the device identifier 176 is included within a list of malicious device identifiers 184 stored in the memory 136. The list of malicious device identifiers 184 is a list of identifiers (e.g., MAC addresses) associated with previously identified malicious devices. The server device 102 may perform a lookup operation on the list of malicious device identifiers 184 by utilizing the device identifier 176, to determine if any of the list of malicious device identifiers 184 match with the received device identifier 176. When processor 132 of the server device 102 determines that the received device identifier 176 does not match any of the list of malicious device identifiers 184, then processor 132 transmits an allow request 186 to the terminal device 106-1 to initiate the temporary mesh network connection 128 between the source device 104-1 and the terminal device 106-1 to perform the first type of interaction 120-1.

In another embodiment, temporary mesh network connection 128 may utilize a transport layer security protocol (e.g., TLS 1.3) that provides end-to-end encryption for all the data exchanged between the source device 104-1 and the terminal device 106-1 in the temporary mesh network connection 128. Thus, temporary mesh network connection 128 is an end-to-end encrypted temporary mesh network connection 128.

In an embodiment, the source token 182 transmitted to the terminal device 106-1 within the connection initiation request 126 may include a terminal output configuration 190. The terminal output configuration 190 may include an indication (e.g., an identifier **130*a*) of the audio signal 130** that is to be output by the terminal device 106-1 upon completion of the first type of interaction 120-1. The audio signal 130 may be any audio file stored at the terminal device 106-1. The terminal output configuration 190 may be generated by the source device 104-1 in response to receiving the instructions 180 from the server device 102. The instructions 180 from the server device 102 include a list of audio signals 191 that are stored at the terminal device 106-1. The user 114 at the source device 104-1 selects one of the files from the list of audio signals 191 that are stored at the terminal device 106-1. In an embodiment, audio signal 130 is one of the files selected from the list of audio signals 191 that are stored at the terminal device 106-1. Upon receiving the selection of audio signal 130, the source device 104-1 generates the source token 182 and includes an identifier 130*a* associated with the audio signal 130. The audio signals 191 (including audio signal 130) stored at the terminal device 106-1 may include any audio file that may be output by the output device 156-1 (e.g., a speaker) of the terminal device 106-1. The source device 104-1 transmits the connection initiation request 126 to the terminal device 106-1, including the source token 182, and the source token 182 includes the device identifier 176 and the terminal output configuration 190.

Monitor the First Type of Interaction

Processor 132 of the server device 102 monitors the first type of interaction 120-1 being performed using the temporary mesh network connection 128 between the source device 104-1 and the terminal device 106-1. The first type of interaction 120-1 includes performing an operation with the terminal device 106-1. In an embodiment, the operation may include checking account information (via the terminal device 106-1) associated with the user 114 stored at a database 188 of the server device 102. In an embodiment, the terminal device 106-1 may be an ATM device, and the operation associated with the first type of interaction 120-1 may be withdrawing a first amount of currency from the terminal device 106-1. In an embodiment, the terminal device 106-1 may be a vending machine, and the operation associated with the first type of interaction 120-1 may be dispensing a product from the terminal device 106-1.

Processor 132 of the server device 102 monitors the first type of interaction 120-1 being performed using the temporary mesh network connection 128 and determines whether the operation associated with the first type of interaction 120-1 was successfully completed. In an embodiment, when the operation associated with the first type of interaction 120-1 is checking account information, then processor 132 of the server device 102 monitors the terminal device 106-1 and determines if the account information was displayed on the output device 156-1 (e.g., a display screen) of the terminal device 106-1. In response to determining that the account information was successfully displayed on the output device 156-1, the processor 132 determines that the operation associated with the first type of interaction 120-1 was successfully completed.

Output at the Source Device

Processor 132 of the server device 102 outputs the audio signal 122-1 at the source device 104-1 and outputs the audio signal 130 at the terminal device 106-1, upon determining that the operation associated with the first type of interaction 120-1 was successfully completed. In an embodiment, the audio signal 122-1 and the audio signal 130 are different from each other. In an embodiment, the audio signal 122-1 and the audio signal 130 are both the same.

In an embodiment, processor 132 of the server device 102 outputs the audio signal 122-1 along with the haptic feedback 124-1 at the source device 104-1 and outputs the audio signal 130 at the terminal device 106-1, upon determining that the operation associated with the first type of interaction 120-1 was successfully completed. The haptic feedback 124-1 may include vibrating the source device 104-1 for a specific time period (e.g., 2 seconds).

In an embodiment, processor 132 of the server device 102 simultaneously, or in conjunction with, outputs the audio signal 122-1 and the haptic feedback 124-1 at the source device 104-1. The haptic feedback 124-1 is a predefined haptic signal pattern (e.g., vibrating three times for one second each), that is predefined by the user 114 of the source device 104-1.

Quarantine the Connection Initiation Request

In an embodiment, back when the server device 102 performs the lookup operation on the list of malicious device identifiers 184 by utilizing the device identifier 176, and processor 132 of the server device 102 determines that the received device identifier 176 does match with one of the list of malicious device identifiers 184, then processor 132 quarantines the connection initiation request 126 at a quarantine memory sector 192. The quarantine memory sector 192 is an isolated portion of the memory 136 of the server device 102.

As part of quarantining the connection initiation request 126, the server device 102 transfers the connection initiation request 126 from the terminal device 106-1 where it was received, into the quarantine memory sector 192 within the memory 136 of the server device 102. The quarantine memory sector 192 is a memory sector created by the processor 132 such that the connection initiation request 126 or any files stored in this quarantine memory sector 192 are not permitted or prevented from acting on files outside the quarantine memory sector 192. Thus, any malicious contents within the connection initiation request 126 is isolated in the quarantine memory sector 192 and thus cannot harm or attack the rest of the components outside the quarantine memory sector 192. Further, the processor 132 may transfer the connection initiation request 126 by first copying the connection initiation request 126 into the quarantine memory sector 192 and then deleting the connection initiation request 126 from the terminal device 106-1 where it was identified.

Generate a Sanitized Version of the Connection Initiation Request

Once the connection initiation request 126 is transferred into the quarantine memory sector 192, the processor 132 determines whether the connection initiation request 126 includes a software code that at least partially matches one of the known malicious software codes 194 stored in the quarantine memory sector 192. The known malicious software codes 194 are previously identified codes that perform malicious activities (e.g., malware attacks). Upon determining that the connection initiation request 126 includes a software code that at least partially matches one of the known malicious software codes 194, the software code is identified as a malicious software code 196. Upon identifying the malicious software code 196, processor 132 mitigates the threat associated with the malicious software code 196 in the connection initiation request 126 by deleting the malicious software code 196 from the connection initiation request 126 to generate a sanitized version of the connection initiation request 198. The sanitized version of the connection initiation request 198 does not include the malicious software code 196. The sanitized version of the connection initiation request 198 is then transferred back to the terminal device 106-1, where the connection initiation request 126 was received. Further, the processor 132 transmits an allow request 186 to the terminal device 106-1 to initiate the temporary mesh network connection 128 between the source device 104-1 and the terminal device 106-1 to perform the first type of interaction 120-1 by utilizing the sanitized version of the connection initiation request 198. In this manner, malware attacks are mitigated by physically isolating the connection initiation request 126 into the quarantine memory sector 192 and proactively deleting the malicious software code 196 from the connection initiation request 126 to create a sanitized version of the connection initiation request 198. Thus, by mitigating malware attacks before an attack takes place, the security of the terminal devices 106 and server device 102 and information stored in the terminal devices 106 and server device 102 is not compromised. Accordingly, the system 100 provides a practical application and technical improvement for proactively detecting malware threats and addresses and mitigating the malware threats before the malicious software code 196 is executed and has a chance to infect the system 100 over the current malware detection technology that is not configured to identify new types of malware before an attack.

In an embodiment, while in the connection initiation request 126 is in the quarantine memory sector 192, and the processor 132 of the server device 102 determines that the connection initiation request 126 does not include the software code that at least partially matches the one of the known malicious software codes 194 stored in the quarantine memory sector 192, then processor 132 transmits an instruction to terminal device 106-1 to deny initiating the temporary mesh network connection 128. In other words, processor 132 denies the terminal device 106-1 to initiate the temporary mesh network connection 128.

When First Type of Interaction was not Successfully Completed

In an embodiment, processor 132 of the server device 102 in response to determining that the operation associated with the first type of interaction 120-1 was not successfully completed, processor 132 outputs an audio signal **122-*n* at the source device 104-1 and outputs a haptic feedback 124-*n* at the source device 104-1. Each of the audio signal 122-1, the audio signal 130, and the audio signal 122-*n* are different from each other. The operation associated with the first type of interaction 120-1 may not be successfully completed for any reason, such as, an error in the terminal device 106-1**.

Figure 3A:
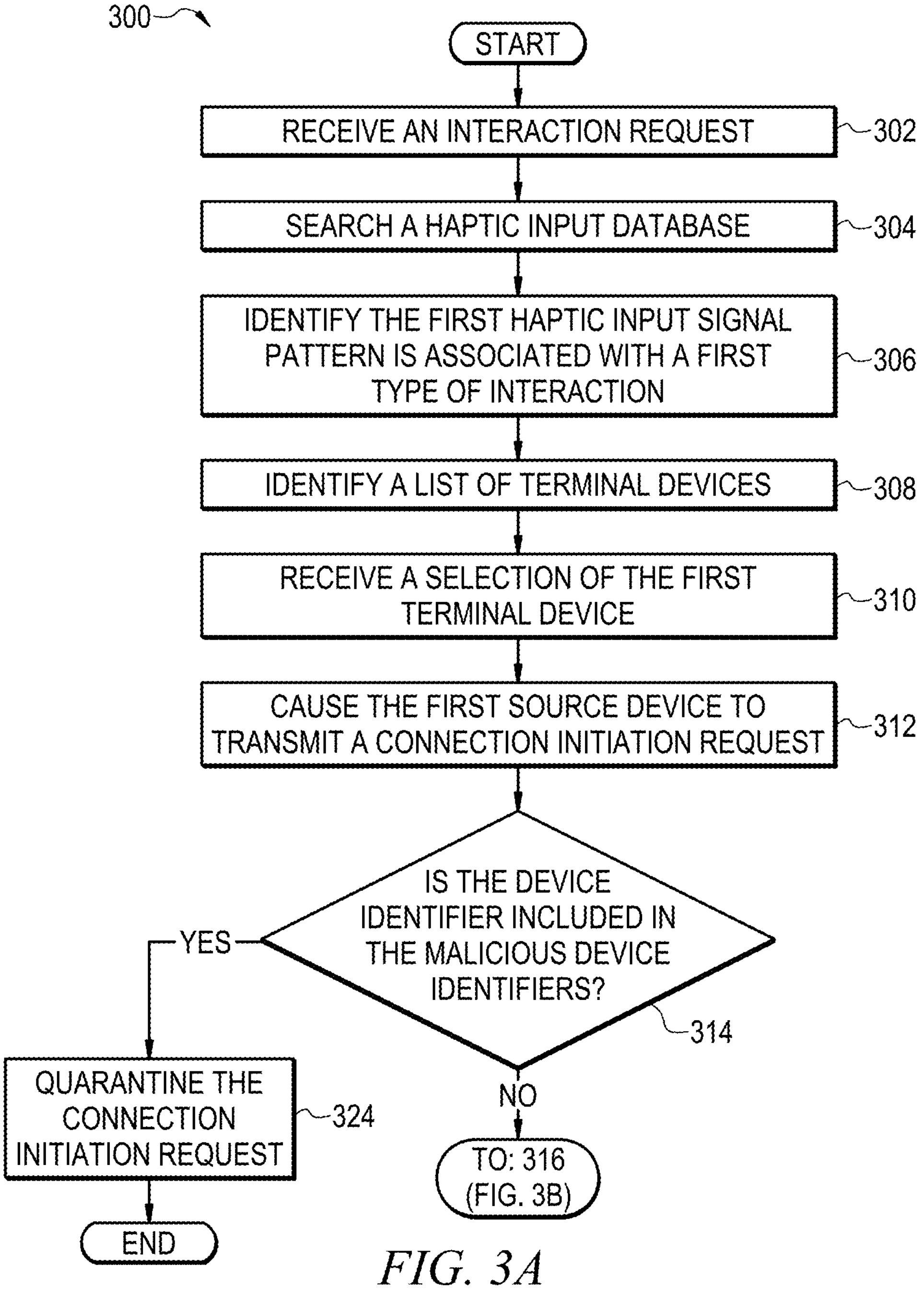
FIGS. 3A-3B illustrates an example flowchart of a method of the system of FIG. 1 for generating haptic feedback-based dedicated temporary mesh network connections.
Figure 3B:
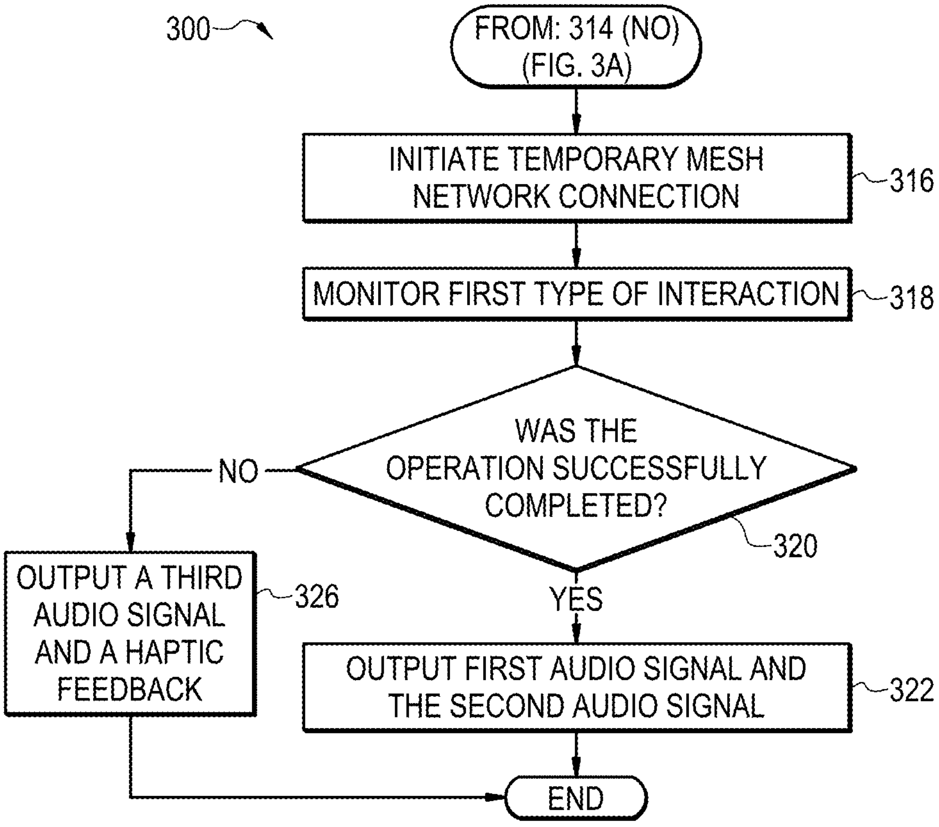

FIGS. 3A-3B illustrates an example flowchart of method 300 for generating haptic feedback-based dedicated temporary mesh network connection 128, in accordance with an embodiment of the present disclosure. For example, one or more operations of method 300 may be implemented, at least in part, in the form of software instructions 138 of FIG. 1, stored on a tangible non-transitory machine-readable medium or a computer-readable medium (e.g., memory 136 of FIG. 1) that, when run by one or more processors (e.g., processor 132 of FIG. 1) may cause the one or more processors to perform operations of the method 300.

Referring to FIGS. 3A-3B, at operation 302, processor 132 of server device 102 electronically receives an interaction request 110 from a source device 104-1 to initiate an interaction with a terminal device 106-1. The interaction request 110 includes the device identifier 176 and the haptic input signal pattern 116-1 generated by sensor 148-1 on the source device 104-1 in response to receiving the input 112 at the source device 104-1.

At operation 304, processor 132 accesses the haptic input database 118 and electronically searches the haptic input database 118 based on the haptic input signal pattern 116-1. Specifically, processor 132 accesses the haptic input database 118 and utilizes the device identifier 176 to perform a lookup operation to search the haptic input database 118 to identify entries that match the device identifier 176.

At operation 306, processor 132 identifies that the haptic input signal pattern 116-1 corresponds with the first type of interaction 120-1. The first type of interaction 120-1 is associated with the audio signal 122-1 that is outputted by the source device 104-1 upon completion of the first type of interaction 120-1.

At operation 308, processor 132 of the server device 102 transmits instructions to the processors 140 associated with the source device 104-1 to identify terminal devices 106 (i.e., a list of terminal devices 106-1 and **106-*n*) that are within a threshold distance D1 to the source device 104-1**.

At operation 310, processor 132 of the server device 102 receives a selection from the list of terminal devices 106-1 and **106-*n*. For example, the user 114 selects terminal device 106-1 from the list of terminal devices 106-1 and 106-*n* to initiate the first type of interaction 120-1. The selection of the terminal device 106-1 is transmitted by the source device 104-1 to the server device 102**.

At operation 312, processor 132 of the server device 102 causes the source device 104-1 to transmit a connection initiation request 126 to the terminal device 106-1, upon receiving the selection of the terminal device 106-1 from the source device 104-1.

At operation 314, processor 132 of the server device 102 utilizes the device identifier 176 (e.g., a MAC address) of the source device 104-1 to determine whether the device identifier 176 is included within a list of malicious device identifiers 184 stored in the memory 136. When processor 132 of the server device 102 determines that the received device identifier 176 does not match any of the list of malicious device identifiers 184, then the method 300 proceeds to operation 316.

At operation 316, processor 132 of the server device 102 transmits an allow request 186 to the terminal device 106-1 to initiate the temporary mesh network connection 128 between the source device 104-1 and the terminal device 106-1 to perform the first type of interaction 120-1.

At operation 318, processor 132 of the server device 102 monitors the first type of interaction 120-1 being performed using the temporary mesh network connection 128 between the source device 104-1 and the terminal device 106-1.

At operation 320, processor 132 of the server device 102 monitors the first type of interaction 120-1 being performed using the temporary mesh network connection 128 and determines whether the operation associated with the first type of interaction 120-1 was successfully completed.

When the operation associated with the first type of interaction 120-1 is checking account information, then processor 132 of the server device 102 monitors the terminal device 106-1 and determines if the account information was displayed on the output device 156-1 (e.g., a display screen) of the terminal device 106-1. In response to determining that the account information was successfully displayed on the output device 156-1, the processor 132 determines that the operation associated with the first type of interaction 120-1 was successfully completed, and the method 300 proceeds to operation 322.

At operation 322, processor 132 of the server device 102 outputs the audio signal 122-1 at the source device 104-1 and outputs the audio signal 130 at the terminal device 106-1, upon determining that the operation associated with the first type of interaction 120-1 was successfully completed. The method ends here.

However, back at operation 320, when the processor 132 of the server device 102 determines that the operation associated with the first type of interaction 120-1 was not successfully completed, processor 132 outputs an audio signal **122-*n* at the source device 104-1 and outputs a haptic feedback 124-*n* at the source device 104-1. Each of the audio signal 122-1, the audio signal 130, and the audio signal 122-*n* are different from the others. The operation associated with the first type of interaction 120-1 may not be successfully completed for any reason, such as an error in the terminal device 106-1**.

Back at operation 314, when the processor 132 of the server device 102 performs the lookup operation on the list of malicious device identifiers 184 by utilizing the device identifier 176, and processor 132 of the server device 102 determines that the received device identifier 176 does match with one of the list of malicious device identifiers 184, then processor 132 quarantines the connection initiation request 126 at a quarantine memory sector 192.

While several embodiments have been provided in the present disclosure, it should be understood that the system 100 and methods might be embodied in many other specific forms without departing from the spirit or scope of the present disclosure.

The present examples are to be considered as illustrative and not restrictive, and the intention is not to be limited to the details given herein. For example, the various elements or components may be combined or integrated with another system or certain features may be omitted, or not implemented. In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein. To aid the Patent Office, and any readers of any patent issued on this application in interpreting the claims appended hereto, applicants note that they do not intend any of the appended claims to invoke 35 U.S.C. § 112(f), as it exists on the date of filing hereof, unless the words "means for" or "step for" are explicitly used in the particular claim.

What is claimed is:

1. A system comprising:

a memory operable to store a haptic input database and a plurality of malicious device identifiers, wherein the haptic input database comprises a plurality of haptic input signal patterns, wherein each of the plurality of haptic input signal patterns is associated with a corresponding type of interaction and wherein each of the malicious device identifiers is associated with a corresponding source device that has been previously identified as performing malicious activities; and a processor operably coupled to the memory and configured to:

receive an interaction request from a first source device to initiate an interaction with a first terminal device, wherein the interaction request comprises a first haptic input signal pattern generated by a sensor on the first source device in response to receiving an input at the first source device;

electronically search the haptic input database based on the first haptic input signal pattern;

identify, based on the search, that the first haptic input signal pattern is associated with a first type of interaction, wherein the first type of interaction is associated with a first audio signal that is outputted by the first source device upon completion of the first type of interaction;

identify a list of terminal devices that are within a first threshold distance to the first source device, wherein the list of terminal devices comprises the first terminal device;

in response to identifying the list of terminal devices, receive a selection of the first terminal device from the list of terminal devices;

in response to receiving the selection of the first terminal device, cause the first source device to transmit a connection initiation request to the first terminal device, wherein the connection initiation request is to initiate a temporary mesh network connection between the first source device and the first terminal device to perform the first type of interaction, wherein:

the connection initiation request comprises a source token associated with the first source device, wherein the source token comprises a device identifier associated with the first source device and a terminal output configuration; and the terminal output configuration comprises an indication of a second audio signal to be outputted by the first terminal device upon completion of the first type of interaction;

determine whether the device identifier is included within the plurality of malicious device identifiers stored in the memory;

in response to determining that the device identifier is not included within the plurality of malicious device identifiers, initiate the temporary mesh network connection between the first source device and the first terminal device to perform the first type of interaction;

monitor the first type of interaction being performed using the temporary mesh network connection between the first source device and the first terminal device, wherein the first type of interaction comprises performing an operation with the first terminal device;

in response to monitoring the first type of interaction, determine whether the operation was successfully completed; and in response to determining that the operation was successfully completed, output the first audio signal at the first source device and the second audio signal at the first terminal device, wherein the first audio signal and the second audio signal are different from each other.

2. The system of claim 1, wherein the processor is further configured to:

in response to determining that the device identifier is included within the plurality of malicious device identifiers, quarantine the connection initiation request at a quarantine memory sector, wherein the quarantine memory sector is an isolated portion of the memory;

in response to quarantining the connection initiation request in the quarantine memory sector, determine whether the connection initiation request comprises a software code that at least partially matches to one of a known malicious software codes stored in the quarantine memory sector, wherein the known malicious software codes are previously identified to perform malicious activities; and in response to determining that the connection initiation request comprises a software code that at least partially matches to one of a known malicious software codes, delete the software code of the connection initiation request that at least partially matches to one of the known malicious software codes to generate a sanitized version of the connection initiation request.

3. The system of claim 2, wherein the processor is further configured to:

in response to generating the sanitized version of the connection initiation request, initiate the temporary mesh network connection between the first source device and the first terminal device to perform the first type of interaction based on the sanitized version of the connection initiation request.

4. The system of claim 2, wherein the processor is further configured to:

in response to determining that the connection initiation request does not comprise the software code that at least partially matches the one of the known malicious software codes stored in the quarantine memory sector, cause the first terminal device to deny initiation of the temporary mesh network connection.

5. The system of claim 1, wherein the processor is further configured to:

in conjunction with outputting the first audio signal at the first source device, output a haptic feedback at the first source device, wherein the haptic feedback is a predefined haptic signal pattern.

6. The system of claim 1, wherein the processor is further configured to:

in response to determining that the operation was not successfully completed, output a third audio signal at the first source device and output a haptic feedback at the first source device.

7. The system of claim 6, wherein the first audio signal, the second audio signal, and the third audio signal are different from each other.

8. A method comprising:

receiving an interaction request from a first source device to initiate an interaction with a first terminal device, wherein the interaction request comprises a first haptic input signal pattern generated by a sensor on the first source device in response to receiving an input at the first source device;

electronically searching a haptic input database based on the first haptic input signal pattern, wherein the haptic input database comprises a plurality of haptic input signal patterns, wherein each of the plurality of haptic input signal patterns is associated with a corresponding type of interaction;

identifying, based on the search, that the first haptic input signal pattern is associated with a first type of interaction, wherein the first type of interaction is associated with a first audio signal that is outputted by the first source device upon completion of the first type of interaction;

identifying a list of terminal devices that are within a first threshold distance to the first source device, wherein the list of terminal devices comprises the first terminal device;

in response to identifying the list of terminal devices, receiving a selection of the first terminal device from the list of terminal devices;

in response to receiving the selection of the first terminal device, causing the first source device to transmit a connection initiation request to the first terminal device, wherein the connection initiation request is to initiate a temporary mesh network connection between the first source device and the first terminal device to perform the first type of interaction, wherein:

the connection initiation request comprises a source token associated with the first source device, wherein the source token comprises a device identifier associated with the first source device and a terminal output configuration; and the terminal output configuration comprises an indication of a second audio signal to be outputted by the first terminal device upon completion of the first type of interaction;

determining whether the device identifier is included within a plurality of malicious device identifiers stored in a memory, wherein each of the malicious device identifiers is associated with a corresponding source device that has been previously identified as performing malicious activities;

in response to determining that the device identifier is not included within the plurality of malicious device identifiers, initiating the temporary mesh network connection between the first source device and the first terminal device to perform the first type of interaction;

monitoring the first type of interaction being performed using the temporary mesh network connection between the first source device and the first terminal device, wherein the first type of interaction comprises performing an operation with the first terminal device;

in response to monitoring the first type of interaction, determining whether the operation was successfully completed; and in response to determining that the operation was successfully completed, outputting the first audio signal at the first source device and the second audio signal at the first terminal device, wherein the first audio signal and the second audio signal are different from each other.

9. The method of claim 8, further comprising:

in response to determining that the device identifier is included within the plurality of malicious device identifiers, quarantining the connection initiation request at a quarantine memory sector, wherein the quarantine memory sector is an isolated portion of the memory;

in response to quarantining the connection initiation request in the quarantine memory sector, determining whether the connection initiation request comprises a software code that at least partially matches to one of a known malicious software codes stored in the quarantine memory sector, wherein the known malicious software codes are previously identified to perform malicious activities; and in response to determining that the connection initiation request comprises a software code that at least partially matches to one of a known malicious software codes, deleting the software code of the connection initiation request that at least partially matches to one of the known malicious software codes to generate a sanitized version of the connection initiation request.

10. The method of claim 9, further comprising:

in response to generating the sanitized version of the connection initiation request, initiating the temporary mesh network connection between the first source device and the first terminal device to perform the first type of interaction based on the sanitized version of the connection initiation request.

11. The method of claim 9, further comprising:

in response to determining that the connection initiation request does not comprise the software code that at least partially matches the one of the known malicious software codes stored in the quarantine memory sector, causing the first terminal device to deny initiation of the temporary mesh network connection.

12. The method of claim 8, further comprising:

in conjunction with outputting the first audio signal at the first source device, outputting a haptic feedback at the first source device, wherein the haptic feedback is a predefined haptic signal pattern.

13. The method of claim 8, further comprising:

in response to determining that the operation was not successfully completed, outputting a third audio signal at the first source device and output a haptic feedback at the first source device.

14. The method of claim 13, wherein the first audio signal, the second audio signal, and the third audio signal are different from each other.

15. A non-transitory computer-readable medium storing instructions that, when executed by a processor, cause the processor to:

receive an interaction request from a first source device to initiate an interaction with a first terminal device, wherein the interaction request comprises a first haptic input signal pattern generated by a sensor on the first source device in response to receiving an input at the first source device;

electronically search a haptic input database based on the first haptic input signal pattern, wherein the haptic input database comprises a plurality of haptic input signal patterns, wherein each of the plurality of haptic input signal patterns is associated with a corresponding type of interaction;

identify, based on the search, that the first haptic input signal pattern is associated with a first type of interaction, wherein the first type of interaction is associated with a first audio signal that is outputted by the first source device upon completion of the first type of interaction;

identify a list of terminal devices that are within a first threshold distance to the first source device, wherein the list of terminal devices comprises the first terminal device;

in response to identifying the list of terminal devices, receive a selection of the first terminal device from the list of terminal devices;

in response to receiving the selection of the first terminal device, cause the first source device to transmit a connection initiation request to the first terminal device, wherein the connection initiation request is to initiate a temporary mesh network connection between the first source device and the first terminal device to perform the first type of interaction, wherein:

the connection initiation request comprises a source token associated with the first source device, wherein the source token comprises a device identifier associated with the first source device and a terminal output configuration; and the terminal output configuration comprises an indication of a second audio signal to be outputted by the first terminal device upon completion of the first type of interaction;

determine whether the device identifier is included within a plurality of malicious device identifiers stored in a memory, wherein each of the malicious device identifiers is associated with a corresponding source device that has been previously identified as performing malicious activities;

in response to determining that the device identifier is not included within the plurality of malicious device identifiers, initiate the temporary mesh network connection between the first source device and the first terminal device to perform the first type of interaction;

monitor the first type of interaction being performed using the temporary mesh network connection between the first source device and the first terminal device, wherein the first type of interaction comprises performing an operation with the first terminal device;

in response to monitoring the first type of interaction, determine whether the operation was successfully completed; and in response to determining that the operation was successfully completed, output the first audio signal at the first source device and the second audio signal at the first terminal device, wherein the first audio signal and the second audio signal are different from each other.

16. The non-transitory computer-readable medium of claim 15, wherein the instructions further cause the processor to:

in response to determining that the device identifier is included within the plurality of malicious device identifiers, quarantine the connection initiation request at a quarantine memory sector, wherein the quarantine memory sector is an isolated portion of the memory;

in response to quarantining the connection initiation request in the quarantine memory sector, determine whether the connection initiation request comprises a software code that at least partially matches to one of a known malicious software codes stored in the quarantine memory sector, wherein the known malicious software codes are previously identified to perform malicious activities; and in response to determining that the connection initiation request comprises a software code that at least partially matches to one of a known malicious software codes, delete the software code of the connection initiation request that at least partially matches to one of the known malicious software codes to generate a sanitized version of the connection initiation request.

17. The non-transitory computer-readable medium of claim 16, wherein the instructions further cause the processor to:

in response to generating the sanitized version of the connection initiation request, initiate the temporary mesh network connection between the first source device and the first terminal device to perform the first type of interaction based on the sanitized version of the connection initiation request.

18. The non-transitory computer-readable medium of claim 16, wherein the instructions further cause the processor to:

in response to determining that the connection initiation request does not comprise the software code that at least partially matches the one of the known malicious software codes stored in the quarantine memory sector, deny the first terminal device to initiate the temporary mesh network connection.

19. The non-transitory computer-readable medium of claim 15, wherein the instructions further cause the processor to:

in conjunction with outputting the first audio signal at the first source device, output a haptic feedback at the first source device, wherein the haptic feedback is a predefined haptic signal pattern.

20. The non-transitory computer-readable medium of claim 15, wherein the instructions further cause the processor to:

in response to determining that the operation was not successfully completed, output a third audio signal at the first source device and output a haptic feedback at the first source device.

* * * * *